US010350513B2

(12) United States Patent
Fenol et al.

(10) Patent No.: US 10,350,513 B2
(45) Date of Patent: Jul. 16, 2019

(54) FACILITY FOR MIXING/SEPARATING IMMISCIBLE LIQUIDS

(71) Applicant: TECHNIP FRANCE, Courbevoie (FR)

(72) Inventors: Guillaume Fenol, Lyons (FR); Olivier Hennequin, Francheville (FR)

(73) Assignee: TECHNIP FRANCE (FR)

(*) Notice: Subject to any disclaimer, the term of this patent is extended or adjusted under 35 U.S.C. 154(b) by 80 days.

(21) Appl. No.: 15/579,283

(22) PCT Filed: Jun. 2, 2016

(86) PCT No.: PCT/EP2016/062544
§ 371 (c)(1),
(2) Date: Dec. 28, 2017

(87) PCT Pub. No.: WO2016/193391
PCT Pub. Date: Dec. 8, 2016

(65) Prior Publication Data
US 2018/0161695 A1    Jun. 14, 2018

(30) Foreign Application Priority Data

Jun. 4, 2015 (FR) ...................... 15 55085

(51) Int. Cl.
*B01F 3/08* (2006.01)
*B01F 5/12* (2006.01)
*B01D 11/04* (2006.01)

(52) U.S. Cl.
CPC ........ *B01D 11/0457* (2013.01); *B01F 3/0807* (2013.01); *B01F 3/0811* (2013.01); *B01F 3/0853* (2013.01); *B01F 5/12* (2013.01)

(58) Field of Classification Search
CPC ........ B01F 3/0853; B01F 3/0811; B01F 5/12; B01F 3/0807; B01D 11/0457; C08F 6/00; C08G 77/34; C08G 85/002; C09F 1/02
See application file for complete search history.

(56) References Cited

U.S. PATENT DOCUMENTS 905,025 A * 11/1908 Trent .................... B01F 7/1625
                                                        366/265
1,752,045 A *  3/1930 Wagner ................ B01D 47/085
                                                         261/91

(Continued)

FOREIGN PATENT DOCUMENTS

FR    2 352 573 A1   12/1977
FR    2 590 497 A1    5/1987
GB      793 025 A     4/1958

OTHER PUBLICATIONS

International Search Report dated Aug. 10, 2016 in corresponding PCT International Application No. PCT/EP2016/062544.

(Continued)

*Primary Examiner* — Tony G Soohoo
(74) *Attorney, Agent, or Firm* — Ostrolenk Faber LLP

(57) ABSTRACT

A facility (50) for mixing/separating two immiscible liquids (22, 24) having different densities, said facility including a mixer (52) combined with a settler (14), the mixer including a tank (16) provided with two liquid inlets (18, 20); an agitator (28) located in the tank, the agitator being mounted on a shaft (30) rotating around a vertical axis (32); and a lift pump (54) located above the agitator. The pump includes a moving body (56) rotatable along the vertical axis (32), the moving body defining a first frustoconical inner surface (60) positioned along the vertical axis and upwardly flared, and a body (66) that is stationary relative to the tank, the stationary body defining a second frustoconical inner surface (68) positioned along the vertical axis and upwardly flared, the second frustoconical inner surface being situated substantially in an extension of, and above, the first frustoconical inner surface.

11 Claims, 5 Drawing Sheets

(56) References Cited

U.S. PATENT DOCUMENTS

| | | | | | |
|---|---|---|---|---|---|
| 2,180,301 | A | * | 11/1939 | Saylor | B01F 5/22 366/265 |
| 2,301,722 | A | * | 11/1942 | Vaughn | F04D 1/14 415/218.1 |
| 3,086,243 | A | * | 4/1963 | Bergmeister | C08F 6/00 264/140 |
| 3,615,025 | A | * | 10/1971 | Rice et al. | B01D 21/0018 210/521 |
| 3,682,398 | A | * | 8/1972 | Lamort | D21D 1/32 241/46.04 |
| 3,744,635 | A | * | 7/1973 | Horvath | A01K 63/047 210/167.25 |
| 4,235,602 | A | * | 11/1980 | Meyer | B01D 11/0457 210/634 |
| 4,358,206 | A | * | 11/1982 | Schutte | B01F 7/22 366/262 |
| 4,515,482 | A | * | 5/1985 | Schadewald | B01F 5/12 366/136 |
| 4,571,090 | A | * | 2/1986 | Weetman | B01F 15/00012 210/219 |
| 4,628,391 | A | * | 12/1986 | Nyman | B01D 11/0457 366/265 |
| 4,721,571 | A | * | 1/1988 | Nyman | B01D 11/0457 210/634 |
| 4,747,694 | A | * | 5/1988 | Nyman | B01D 11/0457 366/265 |
| 4,786,187 | A | * | 11/1988 | Nyman | B01D 11/0457 366/265 |
| 5,662,871 | A | * | 9/1997 | Nyman | B01D 11/0457 210/205 |
| 6,033,575 | A | * | 3/2000 | Perret | B01D 11/0446 210/703 |
| 2018/0161695 | A1 | * | 6/2018 | Fenol | B01D 11/0457 |

OTHER PUBLICATIONS

Written Opinion dated Aug. 10, 2016 in corresponding PCT International Application No. PCT/EP2016/062544.

Preliminary Search Report dated Mar. 22, 2016 in corresponding French Application No. 1555085.

* cited by examiner

FACILITY FOR MIXING/SEPARATING IMMISCIBLE LIQUIDS

CROSS-REFERENCE TO RELATED APPLICATIONS

The present application is a 371 National Phase of International Application No. PCT/EP2016/062544, filed Jun. 2, 2016, which claims benefit of French Application No. 1555085, filed Jun. 4, 2015, the content of which are incorporated herein by reference.

TECHNICAL FIELD OF THE INVENTION

The present invention relates to a facility for mixing/separating two immiscible liquids having different densities.

More specifically, the invention relates to a facility of the type comprising a mixer associated with a settler, said mixer including: a tank provided with two liquid inlets; an agitator located in the tank, the agitator being mounted on a shaft rotatable around a vertical axis; and a lift pump located above the agitator.

This facility is in particular intended for mixing an aqueous phase and an organic phase, then settling them, for example in the context of treating ores containing rare earths to be separated.

BACKGROUND OF THE INVENTION

Such a facility is in particular known from document FR 2,352,573. It includes a lift pump, intended to transfer the aqueous phase/organic phase mixture toward a settler. The lift pump typically includes a stationary frustoconical stator in which a rotor rotates, made up of blades mounted on a shaft. The rotation of the rotor generates a rising of the liquid against the inner wall of the frustoconical stator. The mixture of liquids overflows toward an upper level of the facility and flows toward the settler.

A similar facility is known from document GB 793,025, which in particular describes a pump including a moving body rotatable along the vertical axis, said moving body defining a first frustoconical inner surface positioned along the vertical axis and upwardly flared.

In some cases, this type of pump is not fully satisfactory. A recent study has in particular shown significant shearing between the rotor and the stator. This phenomenon generates fine droplets that extend the settling time and increase the quantity of organic phase retained in the aqueous phase.

SUMMARY OF THE INVENTION

The present invention aims to provide a facility that allows faster separation of a liquid/liquid mixture, while obtaining separating performance levels greater than or equal to those of the existing devices.

To that end, the invention relates to a facility of the aforementioned type, in which the pump further includes a body that is stationary relative to the tank, said stationary body defining a second frustoconical inner surface positioned along the vertical axis and upwardly flared, said second inner surface being situated substantially in an extension of the first inner surface, above said first inner surface.

According to particular embodiments, the facility comprises one or more of the following features, considered alone or according to any technically possible combination:

the moving body is mounted on the rotating shaft on which the agitator is mounted;

a height of the second frustoconical inner surface is substantially comprised between 1 and 3 times a height of the first frustoconical inner surface, more preferably comprised between 1.5 and 2 times said height of the first frustoconical inner surface, the heights being measured along the vertical axis;

the first frustoconical inner surface of the moving body bears fins extending radially toward the vertical axis;

surfaces of the fins are inclined relative to the vertical axis, by an angle preferably comprised between 5° and 40°, and more preferably close to 15°;

each fin is in the form of a strip wound in a conical spiral;

an intersection of each fin with a horizontal plane passes substantially through a radius of a circle forming the intersection of said plane with the first frustoconical inner surface;

an upper end of the second frustoconical inner surface of the lift pump is configured so as to pour, toward the settler, a liquid rising on the first and second frustoconical inner surfaces;

the facility comprises several assemblies installed in series, each assembly being formed by a mixer associated with a settler.

The invention also relates to a method for mixing/separating two immiscible liquids having different densities, the method comprising the following steps: in a facility as described above, introducing two immiscible liquids into the tank; rotating the shaft bearing the agitator, so as to mix the two liquids; rotating the first frustoconical inner surface of the lift pump; causing the mixture of liquids to rise on the first and second frustoconical inner surfaces; and causing the mixture to flow toward the settler.

BRIEF DESCRIPTION OF THE DRAWINGS

The invention will be better understood upon reading the following description, provided solely as an example and done in reference to the drawings, in which.

DESCRIPTION OF EMBODIMENTS OF THE INVENTION

Figure 1:
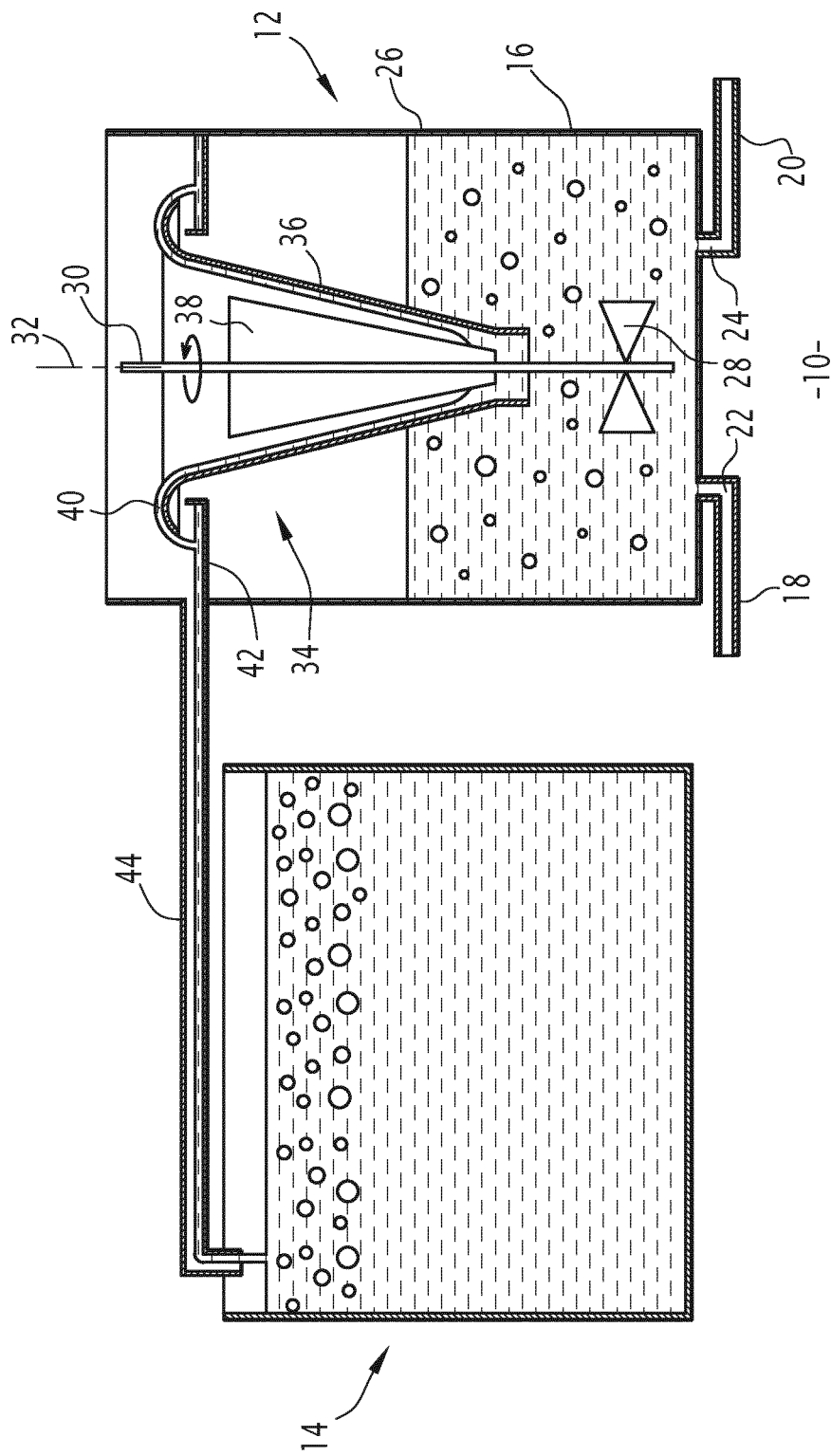
FIG. 1 is a schematic sectional view of a mixing/separating facility according to the state of the art.

The facility 10 of FIG. 1 is a mixer/settler as described in document FR 2,352,573. Several mixers/settlers 10 can be juxtaposed in series to form an extraction battery.

The facility 10 includes a mixer 12 and a settler 14. The mixer 12 includes a tank 16 at the base of which two liquid inlets 18, 20 emerge, respectively corresponding to the aqueous phase 22 and the organic phase 24. The tank 16 is filled with a mixture of the liquids 22, 24 up to a level 26.

The mixer 12 further includes an agitator 28 situated in the tank 16. The agitator is mounted on a shaft 30 rotating around a vertical axis 32.

The mixer 12 further includes a lift pump 34, located above the agitator. The pump 34 in particular includes a stationary frustoconical stator 36, positioned along the vertical axis 32 and flared upward. A rotor 38, made up of blades mounted on the shaft 30, rotates in the stator 36.

When the shaft 30 is rotated by a motor (not shown), the rotation of the rotor 38 generates a rising of the liquid contained in the tank 16 against the inner wall of the frustoconical stator 36. The mixture of liquids contained in the tank 16 reaches an upper spout 40 of the stator 36 and overflows toward an upper level 42 of the facility. A flow ramp 44 then leads the mixture toward the settler 14.

The settler 14 in particular includes a tank, as well as separate flow means (not shown) for the two phases 22, 24 after separation, as described in document FR 2,352,573.

Figure 2:
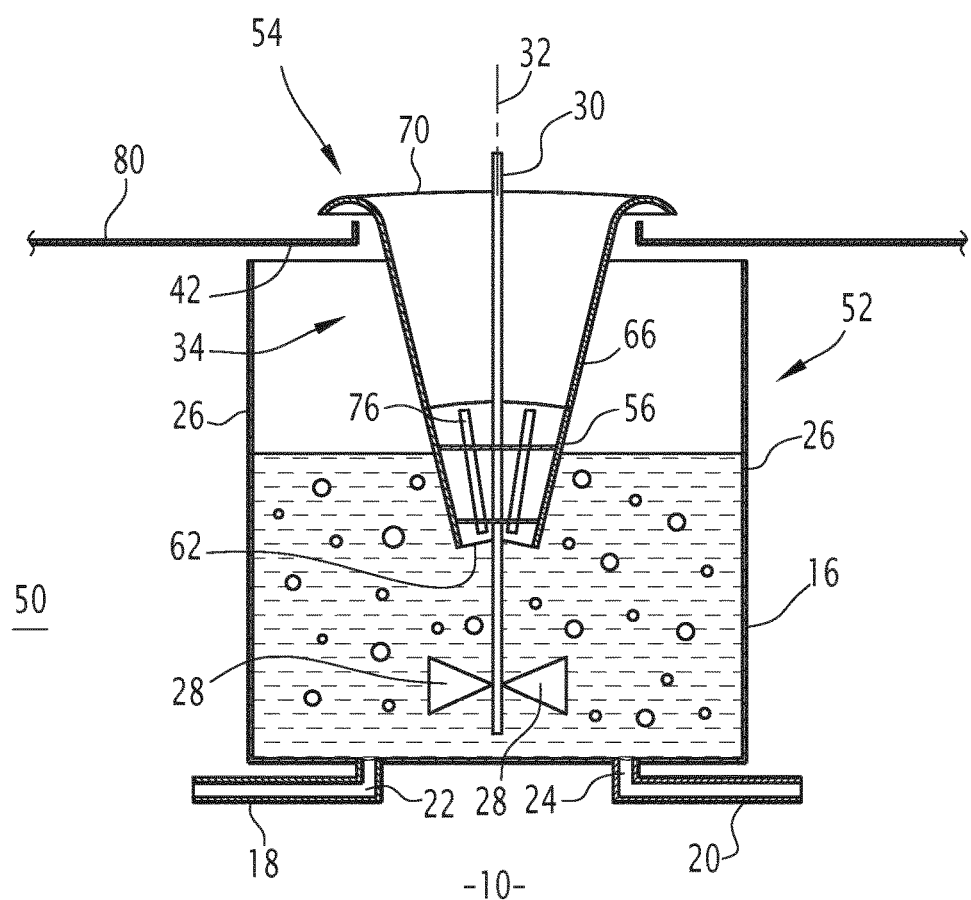
FIG. 2 is a sectional detail view of a mixing/separating facility according to a first embodiment of the invention, in particular comprising a lift pump.

FIG. 2 is a detail view of a mixing/separating facility 50 according to one embodiment of the invention. More specifically, FIG. 2 shows a mixer 52 of the facility 50. The mixer 52 is connected to a settler (not shown) similar to the settler 14 of FIG. 1.

The mixer 52 includes several elements identical to those of the mixer 12. These elements will be designated using the same reference numbers as above.

The mixer 52 in particular includes a tank 16 at the base of which two liquid inlets 18, 20 emerge, respectively corresponding to the aqueous phase 22 and the organic phase 24. The tank 16 is filled with a mixture of the liquids 22, 24 up to a level 26.

The mixer 52 further includes an agitator 28 situated in the tank 16. The agitator is mounted on a shaft 30 rotating around a vertical axis 32.

The mixer 52 further includes a lift pump 54, located above the agitator. The pump 54 is shown in detail in FIG. 3.

The lift pump 54 includes a moving frustoconical body 56, secured to the rotating shaft 30. More specifically, the moving frustoconical body 56 is mounted on the shaft 30 using transverse bars 58 extending radially around such shaft 30.

The body 56 has a shape similar to that of the frustoconical stator 36 of FIG. 1. The moving body 56 defines a first frustoconical inner surface 60, positioned along the vertical axis 32 and upwardly flared. The first frustoconical inner surface 60 extends between the lower end 62, close to the agitator 28, and an upper end 64.

The pump 54 further includes a stationary frustoconical body 66. Similarly to the stator 36 of FIG. 1, the stationary frustoconical body 66 is stationary relative to the tank 16. The stationary frustoconical body 66 defines a second frustoconical inner surface 68, positioned along the vertical axis 32 and upwardly flared.

An upper end 70 of the second frustoconical inner surface 68 is in the form of a spout. More specifically, the upper end 70 is in the form of a flange protruding radially outward from the cone defining the surface 68.

The stationary frustoconical body 66 is situated above the moving frustoconical body 56, such that the first 60 and second 68 frustoconical inner surfaces are situated substantially in the extension of one another. Preferably, the upper end 64 of the moving body 56 is situated inside the stationary body 66, near a lower end 72 of said stationary body. In order for the moving body 56 to be able to rotate in the stationary body 66, a small amount of play is preferably arranged between said bodies 56, 66.

Preferably, the angles between the vertical axis 32 and a generatrix of the cones respectively defining the first 60 and second 68 frustoconical inner surfaces are substantially equal. Such an angle is preferably comprised between 5° and 12°. More preferably, the angle is equal to 9°±0.5°. The overall shape of the first 60 and second 68 frustoconical inner surfaces, in the extension of one another, is therefore substantially that of a single cone trunk.

Preferably, a height 73 of the second frustoconical inner surface 68 is substantially comprised between 1 and 3 times a height 74 of the first frustoconical inner surface 60, the heights being measured along the vertical axis 32. More preferably, the height 73 of the second surface 68 is comprised between 1.5 and 2 times the height 74 of the first surface 60. For example, the height 74 of the first surface 60 is about 35 cm and the height 73 of the second surface 68 is about 65 cm.

Preferably, the first frustoconical inner surface 60 bears fins 76 extending radially, toward the vertical axis 32. The number of fins is for example comprised between three and twelve, distributed regularly around the axis 32. Preferably, the fins 76 extend substantially over the entire height 74 of the first frustoconical inner surface 60, between the lower end 62 and the upper end 64.

Figure 3:
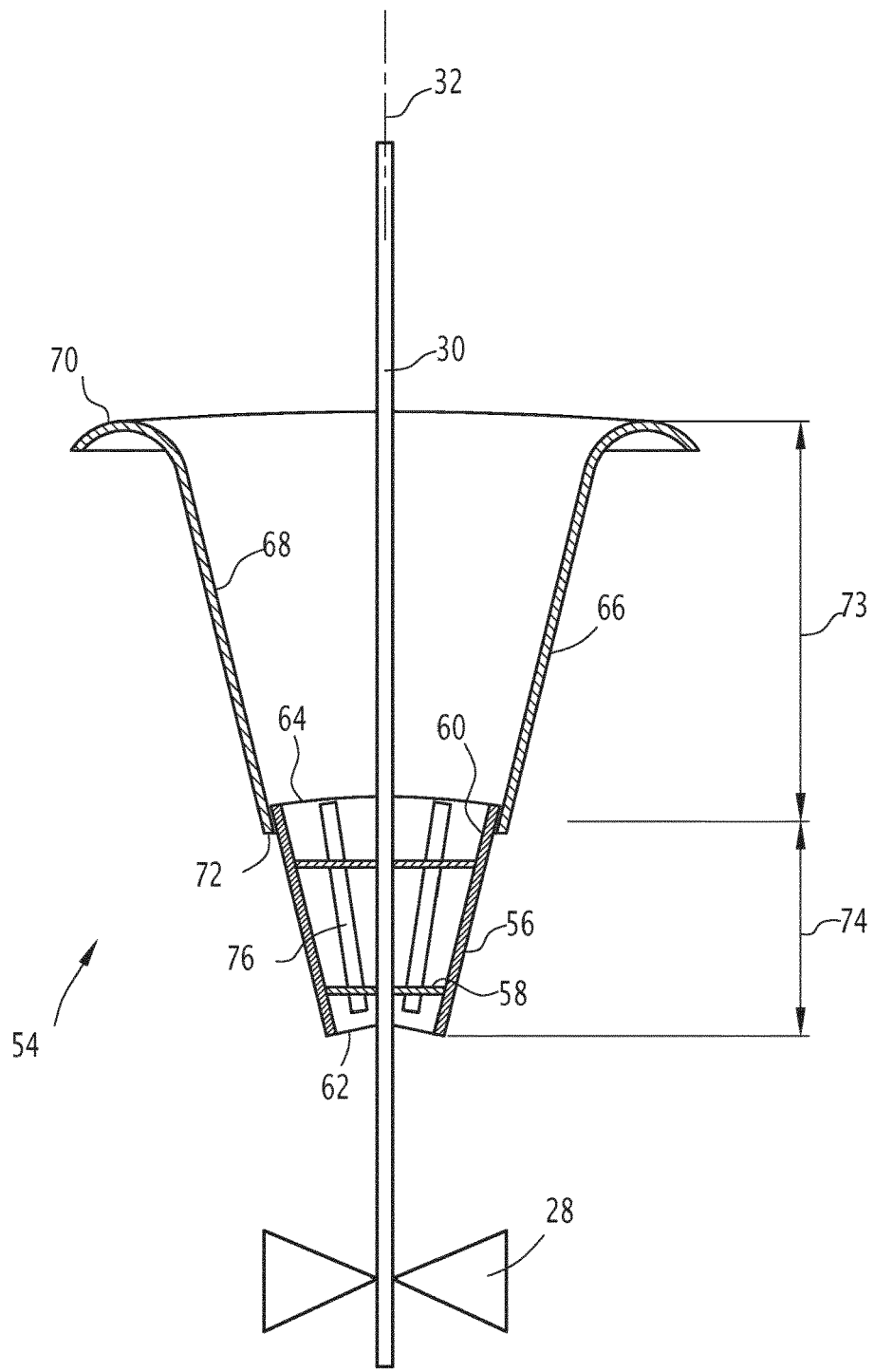
FIG. 3 is a sectional view of the lift pump of the mixing/separating facility of FIG. 2.

In the embodiment of FIGS. 2 and 3, the fins 76 extend substantially along generatrices of the cone forming the first frustoconical inner surface 60. The fins 76 are therefore comprised in vertical planes passing through the axis 32.

The moving frustoconical body 56 and the fins 76, secured to the shaft 30, are rotatable around the axis 32 relative to the tank 16.

According to one alternative of the embodiments of FIGS. 2 and 3, the moving frustoconical body 56 and the agitator 28 are connected to separate means for setting in rotation along the vertical axis 32. Thus, it is in particular possible to move the frustoconical body 56 and the agitator 28 at different speeds.

Figure 4:
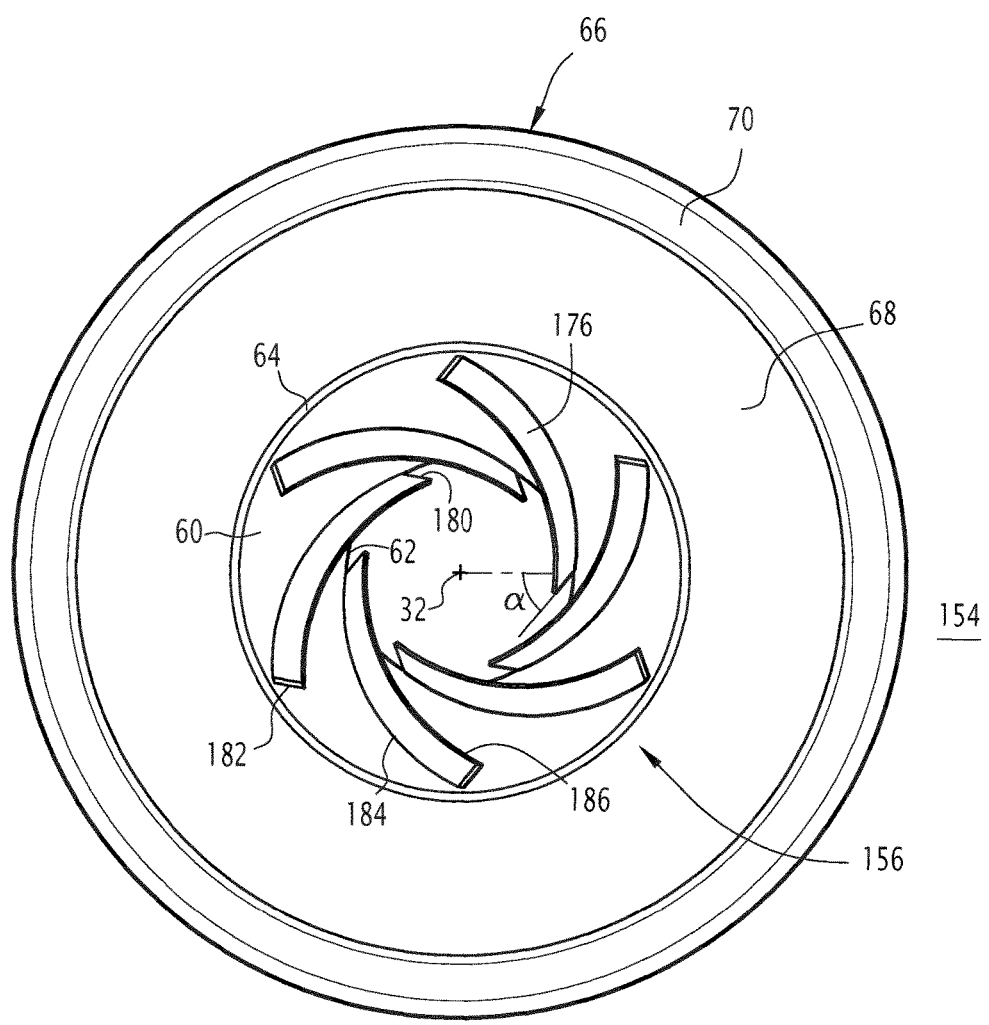
FIG. 4 is a detail top view of a lift pump of a mixing/separating facility according to another embodiment of the invention.

FIG. 4 is a partial top view of a lift pump 154 according to another embodiment of the invention. With the exception of the differences outlined below, the lift pump 154 is similar to the lift pump 54 of FIGS. 2 and 3, described above.

The lift pump 154 includes a stationary frustoconical body 66, identical to the stationary frustoconical body of FIGS. 2 and 3. The lift pump 154 includes a moving frustoconical body 156, able to replace the moving frustoconical body 56 of the pump 54 of FIGS. 2 and 3. A lower part of the moving frustoconical body 156 is shown schematically, in side view, in FIG. 5.

The moving frustoconical body 156 includes a frustoconical inner surface 60, identical to the inner surface of the body 56 of FIGS. 2 and 3 and positioned along the vertical axis 32, between the lower 62 and upper 64 ends.

The moving frustoconical body 156 includes a plurality of fins 176, secured to the surface 60 and distributed regularly around the axis 32. Preferably, the body 156 includes between six and twelve fins. Preferably, the fins 176 are substantially identical.

A lower end 180 of each of the fins 176 is positioned at the lower end 62 of the surface 60. Preferably, an upper end 182 of each of the fins 176 is positioned at the upper end 64 of the surface 60.

Unlike the embodiment of FIGS. 2 and 3, the fins 176 are inclined relative to the axis 32 and to the generatrices of the cone forming the surface 60. In particular, each fin 176 is in the form of a strip wound in a conical spiral around the axis 32.

The lower end 180 of a fin 176 is a rectilinear edge positioned in the horizontal plane of the end 62 and forming an angle α with a radius of the circle defining said end 62.

The angle α is comprised between 0 and 60°, preferably between 0° and 20°, and more preferably between 0° and 10°.

Still more preferably, the angle α between a fin 176 and a radius of the circle defining the lower end 62 is close or equal to 0°.

According to one preferred embodiment, in any horizontal plane passing through the surface 60, the fin 176 forms a substantially constant angle α with a radius of the circle defining said surface 60. Said angle α is advantageously close or equal to 0°. Thus, an intersection of each fin 176 with a horizontal plane passes substantially through a radius of the circle forming said surface 60.

Along the axis 32, the fin 176 has a substantially constant width between an outer edge 184, in contact with the surface 60, and an inner edge 186. As an example, the width of a fin is about 30 mm.

Figure 5:
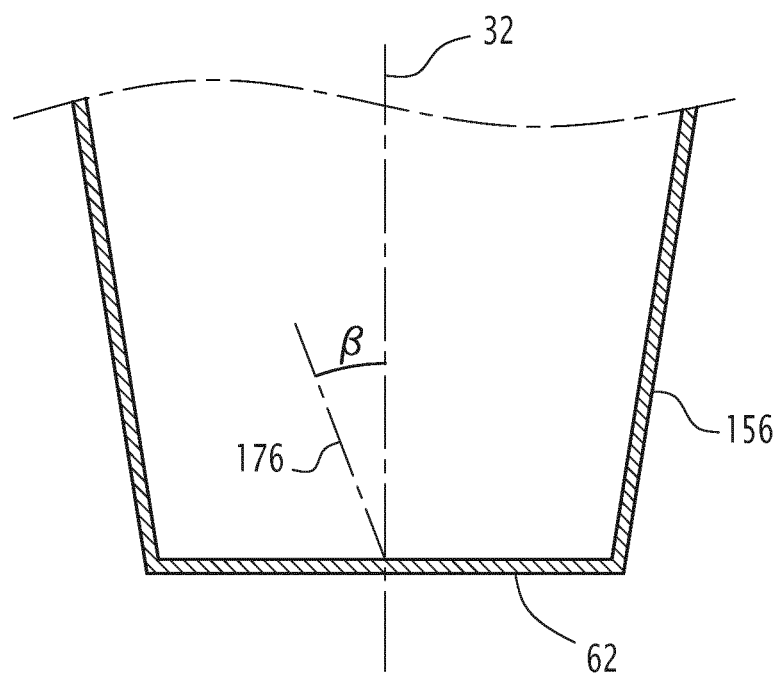
FIG. 5 is a schematic detail side view of the lift pump of FIG. 4.

As shown in FIG. 5, a surface of a fin 176 forms, with the axis 32, an angle β comprised between 5° and 40°, preferably comprised between 10° and 30°, and more preferably equal to 15°±0.5°. In the embodiment of FIGS. 4 and 5, the angle β is substantially constant over a height of the fin 176.

According to one alternative, the angle β formed by the surface of a fin 176 with the vertical axis 32 is variable over the height of the fin. More preferably, said angle between the surface of the fin and the axis 32 decreases between the lower end 180 and the upper end 182, the fin thus being curved upward.

In the embodiments of FIGS. 2 to 5, the second frustoconical inner surface 68 has no fins. According to one alternative (not shown), the second frustoconical inner surface 68 also bears fins extending radially, toward the vertical axis 32. Said fins of the second surface 68 are preferably inclined relative to the vertical.

An operation of the facility 50 (FIG. 2) will now be described. The shaft 30 is rotated around the axis 32 by a motor (not shown). The rotation of the agitator 28 leads to the mixing of the two phases 22, 24 of the liquid of the tank 16. Furthermore, the rotation of the body 56, 156 drives the liquid in the tank 16. The liquid then rises against the moving lower part 56 of the cone, then continues its trajectory against the stationary upper part 66, up to the spout 70. The liquid overflows toward an upper level 80 of the facility, where it is driven toward the settler 14.

This configuration of the pump 54 makes it possible to decrease the kinetic energy of the liquid at the spout, which limits the shearing. The shape of the fins of the moving body 56 makes it possible to influence the shearing and the ratio between the liquid flow rate at the spout 70 and the rotation speed of the motor. In particular, the inclined fins 176, shown in FIGS. 4 and 5, are preferable to the vertical fins 76 of FIGS. 2 and 3.

In one advantageous embodiment, several lift pumps 54, 154 are installed in series to form an extraction battery. It is also possible to install, in series, one or several lift pumps 54, 154 according to the invention with one or several lift pumps 34 of the state of the art.

In such an extraction battery, an aqueous liquid phase 22, for example containing rare earths, is placed in contact in the form of a stream countercurrent with an organic phase 24, for example containing an extraction agent. The organic phase is thus gradually enriched with rare earths.

The invention claimed is:

1. A facility for mixing/separating two immiscible liquids having different densities, said facility comprising a mixer combined with a settler, said mixer including:
   a tank provided with two liquid inlets;
   an agitator located in the tank, the agitator being mounted on a shaft rotating around a vertical axis; and
   a lift pump located above the agitator;
   wherein the pump includes:
   a moving body rotatable along the vertical axis, said moving body defining a first frustoconical inner surface positioned along the vertical axis and upwardly flared, and
   a body that is stationary relative to the tank, said stationary body defining a second frustoconical inner surface positioned along the vertical axis and upwardly flared, said second frustoconical inner surface being situated in an extension of, and above, said first frustoconical inner surface.

2. The facility according to claim 1, wherein a height of the second frustoconical inner surface is comprised between 1 and 3 times a height of the first frustoconical inner surface, the heights being measured along the vertical axis.

3. The facility according to claim 1, wherein the first frustoconical inner surface of the moving body bears fins extending radially toward the vertical axis.

4. The facility according to claim 3, wherein surfaces of the fins are inclined relative to the vertical axis, by an angle (β) comprised between 5° and 40°.

5. The facility according to claim 3, wherein each fin is in the form of a strip wound in a conical spiral.

6. The facility according to claim 3, wherein an intersection of each fin with a horizontal plane passes through a radius of a circle forming the intersection of said plane with the first frustoconical inner surface.

7. The facility according to claim 3, wherein surfaces of the fins are inclined relative to the vertical axis, by an angle (β) of 15°.

8. The facility according to claim 1, wherein an upper end of the second frustoconical inner surface of the lift pump is configured so as to pour, toward the settler, a liquid rising on the first and second frustoconical inner surfaces.

9. The facility according to claim 1, comprising several assemblies installed in series, each assembly being formed by a mixer associated with a settler.

10. A method for mixing/separating two immiscible liquids having different densities, the method comprising the following steps:
    in a facility according to claim 1, introducing two immiscible liquids into the tank;
    rotating the shaft bearing the agitator so as to mix the two liquids;
    rotating the first frustoconical inner surface of the lift pump;
    causing the mixture of liquids to rise on the first and second frustoconical inner surfaces; and
    causing the mixture to flow toward the settler.

11. The facility according to claim 1, wherein a height of the second frustoconical inner surface is comprised between 1.5 and 2 times a height of the first frustoconical inner surface, the heights being measured along the vertical axis.

* * * * *